(12) United States Patent
Roy et al.

(10) Patent No.: US 10,387,493 B2
(45) Date of Patent: Aug. 20, 2019

(54) METHODS FOR CONVERTING AN XML ARTIFACT INTO A TOPIC MAP INSTANCE AND DEVICES THEREOF

(71) Applicant: Infosys Limited, Bangalore (IN)

(72) Inventors: Suman Roy, Bangalore (IN); Kiran Prakash Sawant, Mumbai (IN); Olivier Charvin, Larmor-Plage (FR)

(73) Assignee: Infosys Limited, Bangalore (IN)

( * ) Notice: Subject to any disclaimer, the term of this patent is extended or adjusted under 35 U.S.C. 154(b) by 811 days.

(21) Appl. No.: 14/560,782

(22) Filed: Dec. 4, 2014

(65) Prior Publication Data

US 2015/0178300 A1 Jun. 25, 2015

(30) Foreign Application Priority Data

Dec. 20, 2013 (IN) .......................... 5997/CHE/2013

(51) Int. Cl.
*G06F 16/84* (2019.01)
*G06F 16/83* (2019.01)

(52) U.S. Cl.
CPC .............. *G06F 16/88* (2019.01); *G06F 16/83* (2019.01)

(58) Field of Classification Search
None
See application file for complete search history.

(56) References Cited

U.S. PATENT DOCUMENTS

| | | | |
|---|---|---|---|
| 7,293,010 B2 | 11/2007 | Angele et al. | |
| 7,487,166 B2 | 2/2009 | Angele et al. | |
| 7,574,652 B2 | 8/2009 | Lennon et al. | |
| 7,865,823 B2 | 1/2011 | Matheson et al. | |
| 8,230,398 B2 | 7/2012 | Frohlich et al. | |
| 2002/0059566 A1* | 5/2002 | Delcambre | G06F 17/2264 717/146 |
| 2011/0035391 A1* | 2/2011 | Werner | G06F 17/30731 707/756 |
| 2011/0099139 A1* | 4/2011 | Coldicott | G06Q 10/06 706/47 |
| 2011/0099536 A1* | 4/2011 | Coldicott | G06F 8/36 717/120 |
| 2011/0153292 A1* | 6/2011 | Lane | G06Q 10/06 703/6 |
| 2011/0153608 A1* | 6/2011 | Lane | G06F 17/3089 707/738 |

OTHER PUBLICATIONS

Bohring, Hannes, and Sören Auer. "Mapping XML to OWL Ontologies." Leipziger Informatik-Tage 72 (2005): 147-156.*
Garshol, Lars Marius, and Dmitry Bogachev. "TM/XML—topic maps fragments in XML." International Conference on Topic Map Research and Applications. Springer Berlin Heidelberg, 2005.*
(Continued)

*Primary Examiner* — Jeff A Burke
(74) *Attorney, Agent, or Firm* — Pepper Hamilton LLP

(57) ABSTRACT

The present invention provides a method and system for converting an XML artifact into a Topic Map instance. The method includes consolidating, by a schema consolidation module, an XML schema of the XML artifact; extracting, by an extracting module, a topic map model from the consolidated XML schema; and generating, by a converter, the topic map instance from the topic map model and the xml artifact.

21 Claims, 4 Drawing Sheets

(56) References Cited

OTHER PUBLICATIONS

Reynolds, Joshua, and W. E. Kimber. "Topic map authoring with reusable ontologies and automated knowledge mining." XML 2002 Conference. 2002.*

Lacoste, Damien, Kiran Prakash Sawant, and Suman Roy. "An efficient XML to OWL converter." Proceedings of the 4th India software engineering conference. ACM, 2011.*

Dr. Dipl.-Ing et al., "Managing Literature References with Topic Maps" Bond University, last accessed Dec. 2, 2012, <http://ausweb.scu.edu.au/aw03/papers/barta2/paper.html>.

Schweiger et al., "Improving Information Retrieval Using XML and Topic Maps", Charting the Topic Maps Research and Applications Landscape, 2006, pp. 253-262.

* cited by examiner

METHODS FOR CONVERTING AN XML ARTIFACT INTO A TOPIC MAP INSTANCE AND DEVICES THEREOF

This application claims the benefit of Indian Patent Application Serial No. 5997/CHE/2013 filed Dec. 20, 2013, which is hereby incorporated by reference in its entirety.

FIELD

The present invention relates generally to a method and system for mapping XML artifacts to Topic map ontology. More specifically, the present invention relates to a method and system for converting an XML artifact to Topic map ontology instance.

BACKGROUND

XML is a convenient standard for data exchange on the internet. Although XML can support syntactic inter-operability and data exchange, XML lacks the capability of sharing concepts. Semantic Web languages support, ontology representation using topics, associations and occurrences. Topic map is a semantic web language that supports ontology representation and data exchange. Hence, by mapping XML artifacts to Topic Map ontology, ontology representations of XML artifacts can be achieved.

Currently several techniques exist that convert XML artifacts to semantic web formalisms such as RDF, OWL and the like. There is a need for a translator that can convert XML to Topic Map ontology as Topic Map provides a neat representation of data and faster query processing capabilities. Further, XML artifacts usually contain large amount of data which can suitably fit as instances corresponding to the Topic Map ontology. Additionally, TM ontology takes less space compared to semantic web formalisms such as RDF, OWL and the like.

Hence, there is a need for a method and a system that can convert XML artifacts to a Topic Map ontology. The alternate method and system, provide a mapping from XML to Topic maps, and techniques for checking correctness of such mapping. Further performance measures of such mapping shall also be provided. Thus a method and a system for mapping XML artifacts to Topic Map ontology is proposed.

SUMMARY

The present invention provides a method for converting an XML artifact into a Topic Map instance. In accordance with a disclosed embodiment, the method may include consolidating an XML schema of the XML artifact. Further a topic map model can be extracted from the consolidated XML schema. Finally, the Topic map instance can be generated from the topic map model and the XML artifact.

In an additional embodiment, a system converting an XML artifact into a Topic Map instance is disclosed. The system comprises a schema consolidation module configured to consolidate an XML schema of the XML artifact. The system further comprises an extracting module, configured to extract a topic map model from the consolidated XML schema. The system may further include a converter configured to generate the topic map instance from the topic map model and the xml artifact.

These and other features, aspects, and advantages of the present invention will be better understood with reference to the following description and claims.

While systems and methods are described herein by way of example and embodiments, those skilled in the art recognize that systems and methods for electronic financial transfers are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Figure 1:
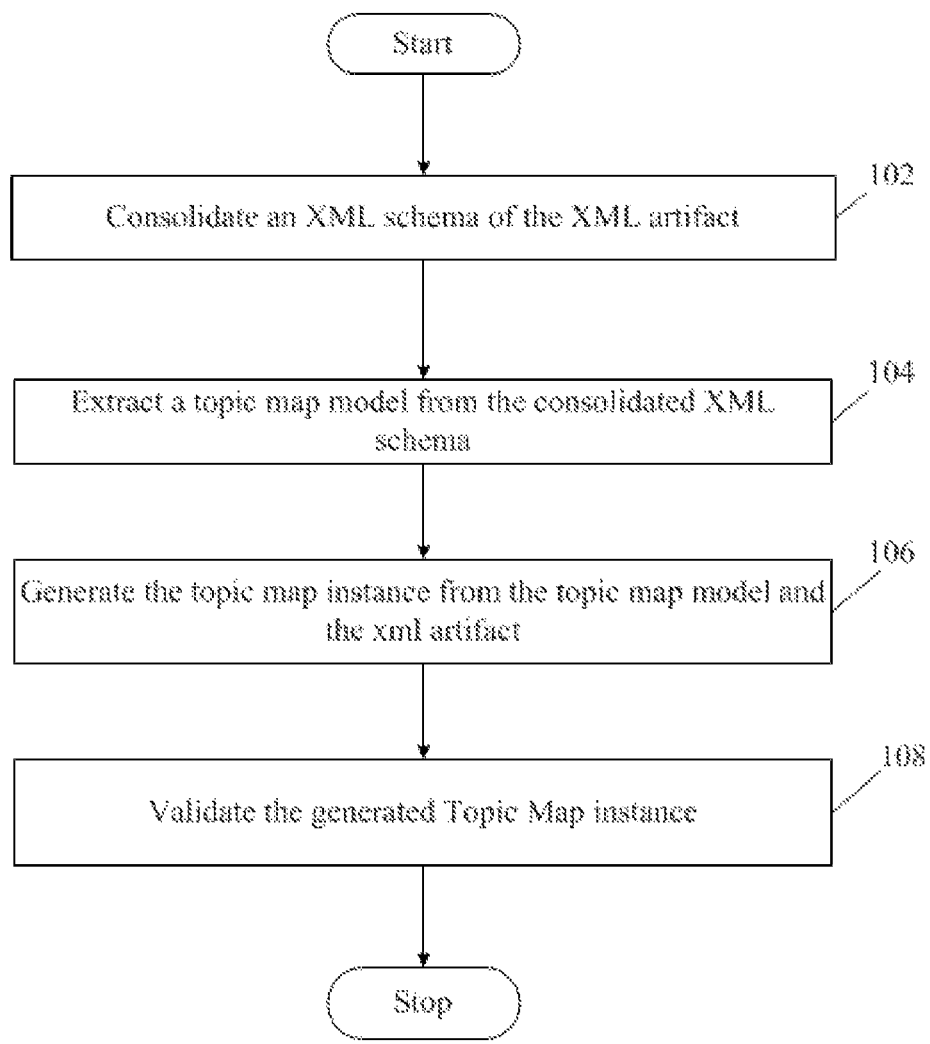
FIG. 1 is a flowchart illustrating an embodiment of a method of converting an XML artifact into a Topic Map instance.

Disclosed embodiments provide computer-implemented methods, systems, and computer-program products for converting an XML artifact into an ontology instance. More specifically the methods, and systems disclosed provide a framework for of converting an XML artifact into a Topic Map instance FIG. 1 illustrated an embodiment of a method of practicing the present invention. At step 102, a XML artifact can be consolidated to form a XML schema. Usually, an XML artifact may contain external references given by 'import' or 'include' constructs, and it may not be easy to handle such constructs during mapping the XML artifact to a Topic Map instance. Further, internal references given by construct 'ref' in XSD files need to be handled in order to avoid impediments during the mapping. The internal references are usually references made to other elements or data types which may be present in the same XML artifact. The external references usually refer to the elements or the data types present in another XML artifact. During schema consolidation, the internal and external references are removed, as presence of the references, may lead to the XML schema being reference many times, and to import schemas from which the XML schema was imported, thereby leading to an infinite loop. In order to remove the reference, a set of files included and imported by a main XML schema can be collected. The collected set of files may then be merged into the XML schema; and the XML schema can be reorganized, whereby reorganizing eliminates an internal reference.

An XML artifact, can be represented by a tree with labeled nodes, where nodes are labeled and outgoing edges are ordered. A topic map model, can be represented by a graph network, where everything is modeled as a topic and two topics may be linked with an association. Further topics may be addressed by occurrences. The tree of the XML artifact can be utilized for build corresponding topic hierarchy of the Topic Map model. A link between two nodes of the XML artifact may be converted into an association in the Topic Map model. At step 104, the topic map model can be extracted from the consolidated XML schema. During extraction, of the topic map model from the consolidated XML schema, a complexType of the XML schema may be translated to an association class of the topic map model. For instance, compositors like, sequence, choice, and all can be mapped to respective association classes such as sequence, choice and all. A root member of the compositors, can be mapped to an association role 'has', which may be linked with a corresponding role playing topic. For a sequence type of the XML schema, each member can be mapped to association roles member(1), member(2), . . . in maintaining the order. In case of type 'all', each member can be mapped to an association role member, whereas for type "choice", each member can be mapped to an association role 'altmember'. Each of the association role shall be connected to a role playing topic. The role playing topic corresponding to 'has' role, shall be linked with a topic via an association instanceof later. Further, a simpleType compositor, shall be mapped to an occurrence type of the Topic Map model. An element of the XML schema shall be mapped to a topic type of the topic map model. An attribute of the element shall be mapped to an association type of the topic type. Further, the element having minOccurs and maxOccurs with integer type can be mapped to an occurrence of interval type. The occurences can be a subclass of a topic of the set of all intervals of integers. In an event an element has maxOccurs, a mapped interval shall be unbounded below with zero as a left boundary point. Similarly, for an element having minOccurs, the mapped interval, shall be bounded above with infinity as a right boundary point.

At step 106, a topic map instance can be generated by a converter, from the XML artifact and the extracted topic map model. Information related to actual values of the XML artifact, may be gathered as other information regarding TM model ontology shall be gathered from corresponding XSD file. In order to uniquely identify each XML instance, added to the topic map, name of each XML instance file shall be unique. The name can be used as a prefix for creation of the topic map instance. Hence each instance of the topic map may be identified. The generated Topic map instance may be validated by a validating module at step 108.

Figure 2:
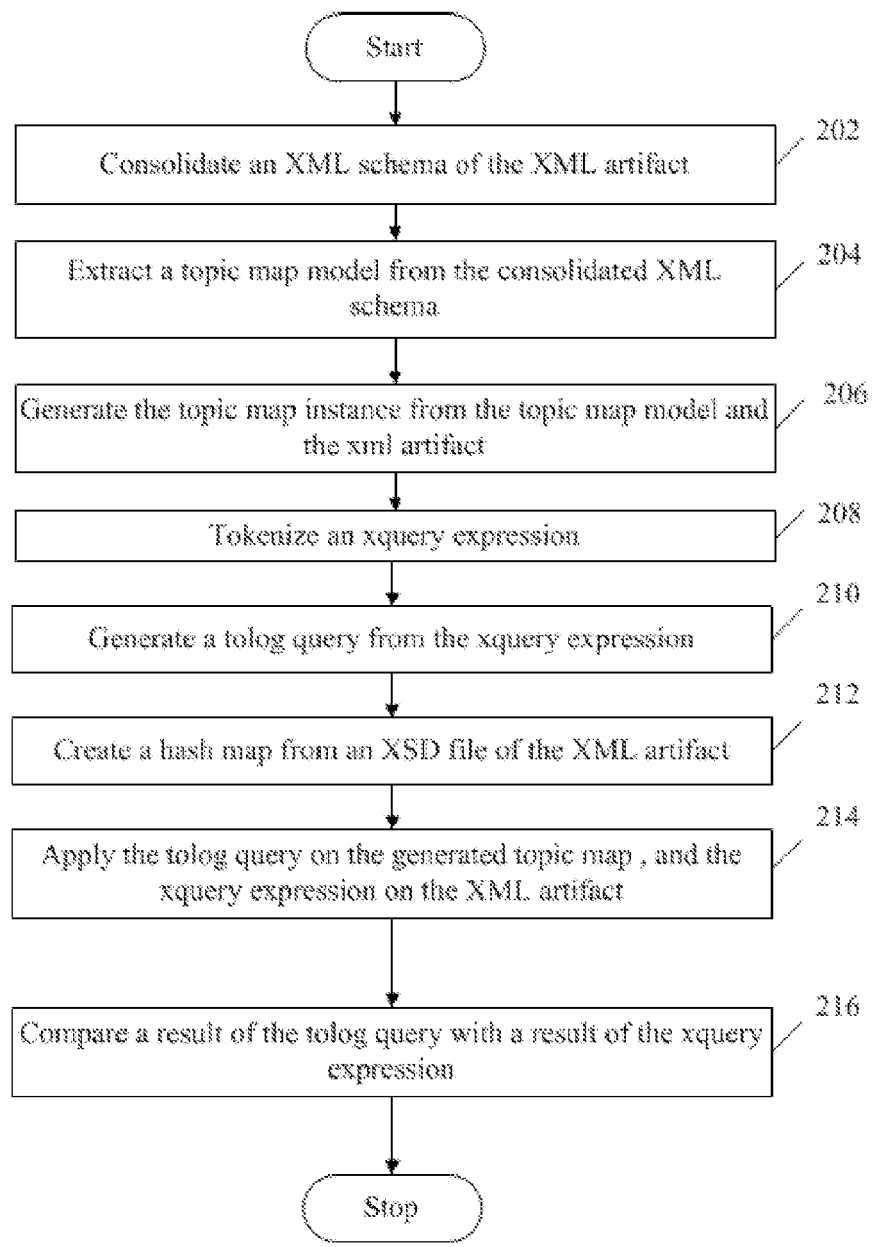
FIG. 2 is a flowchart illustrating an alternate embodiment of a method of converting an XML artifact into a Topic Map instance

FIG. 2 illustrates an alternate embodiment of a method of practicing the present invention. At step 202, an XML schema can be consolidated from an XML artifact. In the aforesaid step all internal references and external references shall be eliminated in order to avoid an infinite loop during conversion of the XML artifact to a Topic Map. At step 204, a topic map model shall be extracted from the consolidated XML schema. At step 206, using the topic map model and the XML artifact as inputs a topic map instance may be generated. In order to validate the generated topic map instance, an xquery expression shall be tokenized at step 208. At step 210, a tolog query shall be generated from the xquery expression. At step 212, a hasp map shall be generated from an XSD file, of the XML artifact. The tolog query shall be applied on the generated topic map instance, and the xquery expression, on the XML artifact at step 214. The result of the tolog query and the xquery expression shall be compared at step 216, in an event the results match; the topic map instance generated shall be construed to be valid.

Figure 3:
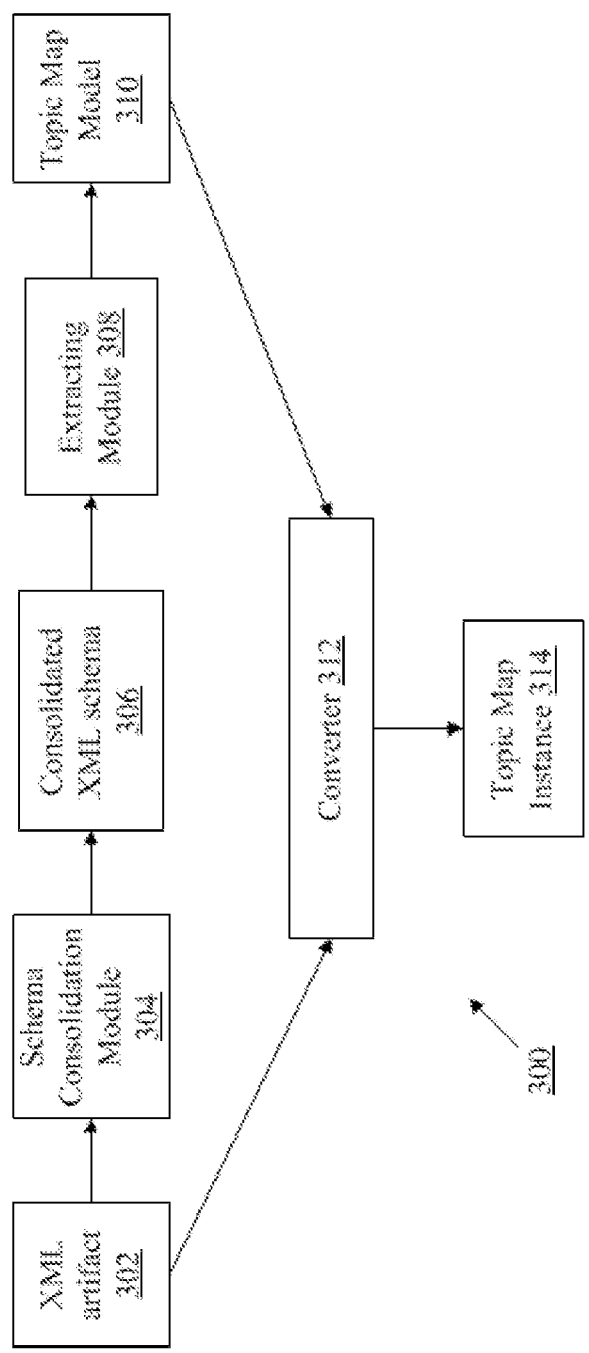
FIG. 3 shows an exemplary system for converting an XML artifact into a Topic Map instance.

FIG. 3 illustrates an exemplary system 300 in which various embodiments of the invention can be practiced. The exemplary system 300 includes an XML artifact 302, a schema consolidation module 304, a consolidated XML schema 306, an extracting module 308, a topic map model 310, and a converter 312. The schema consolidation module 304 can be configured to consolidate an XML schema of the XML artifact 302 to form the consolidated XML schema 306. The extracting module 308 can be configured to extract the topic map model 310 from the consolidated XML schema 306, and the converter 312 can be configured to generate a topic map instance 314 from the topic map model 310 and the xml artifact 302.

Figure 4:
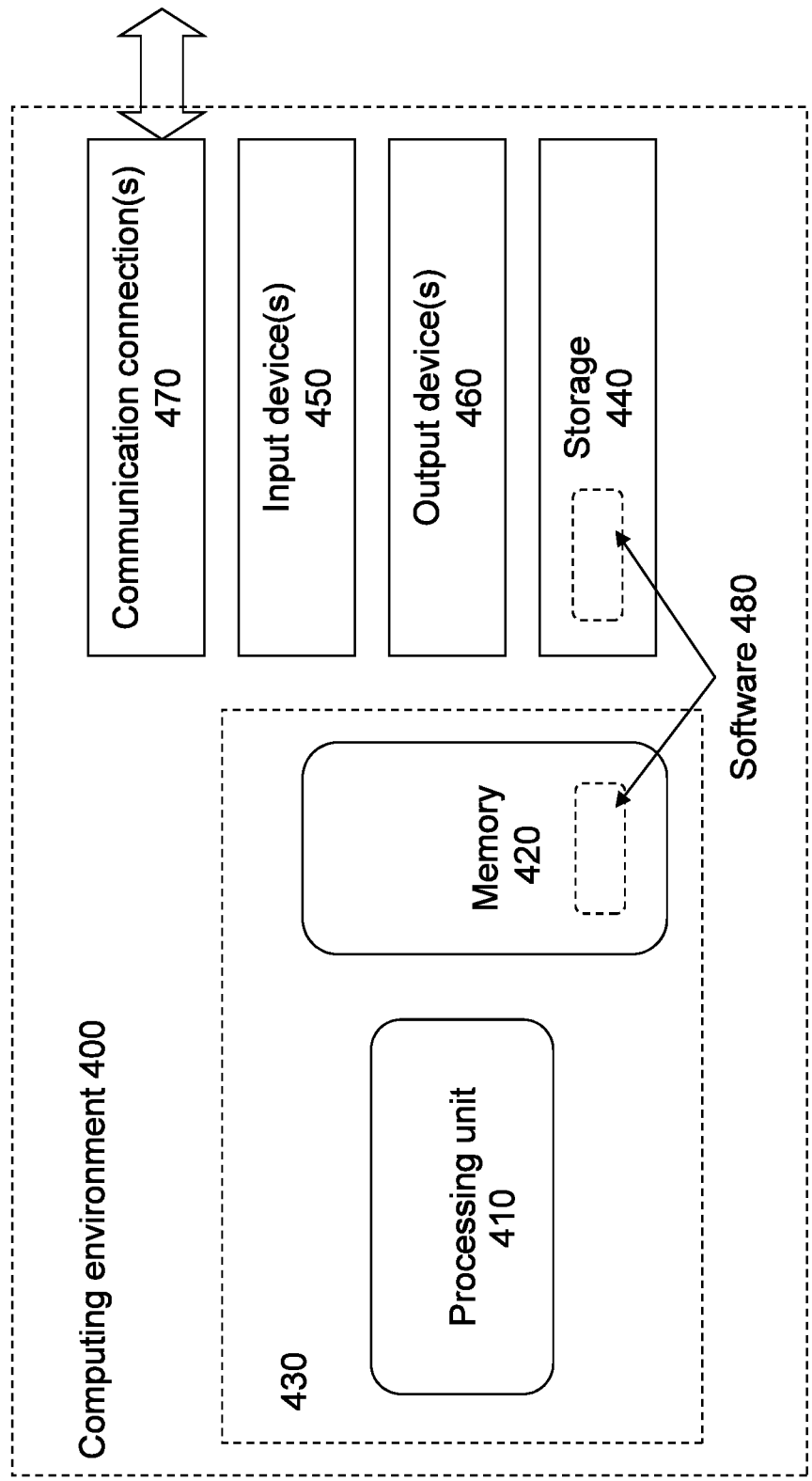
FIG. 4 illustrates a generalized example of a computing environment 400.

One or more of the above-described techniques can be implemented in or involve one or more computer systems. FIG. 4 illustrates a generalized example of a computing environment 400. The computing environment 400 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 440, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and which can be accessed within the computing environment 400. In some embodiments, the storage 440 stores instructions for the software 480.

The input device(s) 450 may be a touch input device such as a keyboard, mouse, pen, trackball, touch screen, or game controller, a voice input device, a scanning device, a digital camera, or another device that provides input to the computing environment 400. The output device(s) 460 may be a display, printer, speaker, or another device that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

What is claimed is:

1. A method of converting an XML artifact into a topic map instance, the method comprising:
    consolidating, by an artifact management computing device, one or more XML artifacts to generate an XML schema, wherein the one or more XML artifacts comprise one or more internal references or one or more external references;
    extracting, by the artifact management computing device, a topic map model from a consolidated XML schema;
    generating, by the artifact management computing device, the topic map instance from the topic map model and the XML artifact
    generating, by the artifact management computing device, a tolog query from a tokenized xquery expression;
    applying, by the artifact management computing device, the tolog query to the generated topic map instance and the xquery expression to the XML artifact; and
    validating, by the artifact management computing device, the generated topic map instance, based on a comparison of results of the applying of the tolog query to the generated topic map instance and applying of the xquery expression to the XML artifact.

2. The method of claim 1, wherein consolidating an XML schema comprises:
    collecting, by the artifact management computing device, a set of files included and imported by a main XML schema;
    merging, by the artifact management computing device, the collected set of files into the XML schema; and
    reorganizing, by the artifact management computing device, the XML schema, whereby reorganizing eliminates an internal reference.

3. The method of claim 2, wherein;
    the complexType of sequence is mapped to a plurality of association role members;
    the complexType of choice is mapped to an association role altmember; and
    each member of the complexType of all is mapped to an association role member.

4. The method of claim 1, wherein extracting a topic map model from the consolidated XML schema, comprises:
    translating, by the artifact management computing device, a complexType of the XML schema to an association class of the topic map model;
    mapping, by the artifact management computing device, a simpleType of the XML schema to an occurrence type of the topic map model, wherein the simpleType is an element having an occurrence value;
    mapping, by the artifact management computing device, an element of the XML schema to a topic type of the topic map model; and
    mapping, by the artifact management computing device, an attribute of the element to an association type of the topic type.

5. The method of claim 1, wherein the consolidating comprises:
    eliminating the one or more internal references or the one or more external references to generate the XML schema.

6. The method of claim 1 further comprising validating, by the artifact management computing device, the generated topic map instance, based on a match between the results of the applying of the tolog query to the generated topic map instance and applying of the xquery expression to the XML artifact.

7. The method of claim 6, wherein the validating comprises:
    creating, by the artifact management computing device, a hash map from an XSD file of the XML artifact.

8. An artifact management computing device comprising:
    a processor; and
    a memory coupled to the processor which is configured to be capable of executing programmed instructions comprising and stored in the memory to:

consolidate one or more XML artifacts to generate an XML schema, wherein the one or more XML artifacts comprise one or more internal references or one or more external references;
extract topic map model from a consolidated XML schema;
generate the topic map instance from the topic map model and the XML artifact;
generate a tolog query from a tokenized xquery expression;
apply the tolog query to the generated topic map instance and the xquery expression to the XML artifact; and
validate the generated topic map instance, based on a comparison of results of the applying of the tolog query to the generated topic map instance and applying of the xquery expression to the XML artifact.

9. The device of claim 8, wherein consolidating an XML schema comprises:
collect a set of files included and imported by a main XML schema;
merge the collected set of files into the XML schema; and
reorganize the XML schema, whereby reorganizing eliminates an internal reference.

10. The device of claim 9, wherein;
the complexType of sequence is mapped to a plurality of association role members;
the complexType of choice is mapped to an association role altmember; and
each member of the complexType of all is mapped to an association role member.

11. The device of claim 8, wherein extracting a topic map model from the consolidated XML schema, comprises:
translate a complexType of the XML schema to an association class of the topic map model;
merge a simpleType of the XML schema to an occurrence type of the topic map model, wherein the simpleType is an element having an occurrence value;
map an element of the XML schema to a topic type of the topic map model; and
map an attribute of the element to an association type of the topic type.

12. The device of claim 8, wherein the consolidating comprises:
eliminate the one or more internal references or the one or more external references to generate the XML schema.

13. The device of claim 8, wherein the processor coupled to the memory is further configured to be capable of executing additional programmed instructions comprising and stored in the memory to validate the generated topic map instance, based on a match between the results of the applying of the tolog query to the generated topic map instance and applying of the xquery expression to the XML artifact.

14. The device of claim 13, wherein the validating comprises:
create a hash map from an XSD file of the XML artifact.

15. A non-transitory computer readable medium having stored thereon instructions for converting an XML artifact into a topic map instance comprising executable code which when executed by a processor, causes the processor to perform steps comprising:
consolidate one or more XML artifacts to generate an XML schema, wherein the one or more XML artifacts comprise one or more internal references or one or more external references;
extract a topic map model from a consolidated XML schema;
generate the topic map instance from the topic map model and the XML artifact;
generate a tolog query from a tokenized xquery expression;
apply the tolog query to the generated topic map instance and the xquery expression to the XML artifact; and
validate the generated topic map instance, based on a comparison of results of the applying of the tolog query to the generated topic map instance and applying of the xquery expression to the XML artifact.

16. The medium of claim 15, wherein consolidating an XML schema comprises:
collect a set of files included and imported by a main XML schema;
merge the collected set of files into the XML schema; and
reorganize the XML schema, whereby reorganizing eliminates an internal reference.

17. The medium of claim 16, wherein;
the complexType of sequence is mapped to a plurality of association role members;
the complexType of choice is mapped to an association role altmember; and
each member of the complexType of all is mapped to an association role member.

18. The medium of claim 15, wherein extracting a topic map model from the consolidated XML schema, comprises:
translate a complexType of the XML schema to an association class of the topic map model;
map a simpleType of the XML schema to an occurrence type of the topic map model, wherein the simpleType is an element having an occurrence value;
map an element of the XML schema to a topic type of the topic map model: and
map an attribute of the element to an association type of the topic type.

19. The medium of claim 15, wherein the consolidating comprises:
eliminate the one or more internal references or the one or more external references to generate the XML schema.

20. The medium of claim 15 further comprising executable code which when executed by a processor, causes the processor to perform an additional step further comprising validating the generated topic map instance, based on a match between the results of the applying of the tolog query to the generated topic map instance and applying of the xquery expression to the XML artifact.

21. The medium of claim 20, wherein the validating comprises:
create a hash map from an XSD file of the XML artifact.

* * * * *